United States Patent [19]

Klees

[11] Patent Number: 5,615,391
[45] Date of Patent: Mar. 25, 1997

[54] SYSTEM FOR AN AUTOMATED IMAGE MEDIA PROCESS STATION WHICH DISPLAYS IMAGES ONLY WHILE CUSTOMER PRESENCE IS DETECTED THEREBY ENSURING PRIVACY

[75] Inventor: Kevin J. Klees, Rochester, N.Y.

[73] Assignee: Eastman Kodak Company, Rochester, N.Y.

[21] Appl. No.: 428,744

[22] Filed: Apr. 25, 1995

[51] Int. Cl.⁶ .................................................. G06F 13/00
[52] U.S. Cl. ......................... 395/839; 395/856; 395/326; 345/156
[58] Field of Search ..................... 395/700, 821, 395/856, 878, 883, 839, 155, 775; 364/707, 410, 146, 188, 222.5; 4/623; 235/375; 187/130; 355/41; 340/504; 345/156; 354/297

[56] References Cited

U.S. PATENT DOCUMENTS

| | | | |
|---|---|---|---|
| 4,930,236 | 6/1990 | Hart | 40/414 |
| 4,932,050 | 6/1990 | Davidson et al. | 379/211 |
| 4,934,079 | 6/1990 | Hoshi | 40/427 |
| 4,972,070 | 11/1990 | Laverty, Jr. | 250/221 |
| 5,025,516 | 6/1991 | Wilson | 4/623 |
| 5,057,817 | 10/1991 | Berube | 340/506 |
| 5,060,323 | 10/1991 | Shaw | 4/623 |
| 5,119,126 | 6/1992 | Tokuda | 355/41 |
| 5,149,921 | 9/1992 | Picado | 187/130 |
| 5,198,976 | 3/1993 | Form et al. | 364/410 |
| 5,264,683 | 11/1993 | Yoshikawa | 235/375 |
| 5,293,097 | 3/1994 | Elwell | 315/154 |
| 5,412,816 | 5/1995 | Paterson et al. | 4/623 |

*Primary Examiner*—Thomas C. Lee
*Assistant Examiner*—Ki S. Kim
*Attorney, Agent, or Firm*—Christopher J. Fildes

[57] ABSTRACT

An automated image media processing station includes a image media processing apparatus for processing a customer's image media in accordance with a transaction sequence and a video display allowing the customer to view images during processing. The station includes a customer interface in communication with the processing apparatus interfacing the customer with the apparatus and a customer detector in communication with at least one of the customer interface and the processing apparatus for detecting the presence of the customer within a range and field of view of the detector whereby such presence allows the video display to display the images captured on the image media for the customer, and undetected presence discontinues further display of the images.

7 Claims, 2 Drawing Sheets

SYSTEM FOR AN AUTOMATED IMAGE MEDIA PROCESS STATION WHICH DISPLAYS IMAGES ONLY WHILE CUSTOMER PRESENCE IS DETECTED THEREBY ENSURING PRIVACY

FIELD OF THE INVENTION

This invention relates to a customer operated image media apparatus and more particularly to a customer operated automated image media processing station wherein a customer's image media is processed, media images are displayed on a video screen, and selected prints are made.

BACKGROUND OF THE INVENTION

Conventional rapid photofinishing has evolved to the mini-lab type system wherein a skilled operator takes a customers's film, inserts it into a processing machine, and packages the processed prints. In this type of operation, the film images are only viewed by the operator of the mini-lab system. A new generation of photofinishing apparatus allows a customer to operate the developing apparatus.

Such apparatus are referred to as "photo vending" or "photo ATM" devices. One goal of these devices is to remove the need for skilled operators, and make rapid access to film images available at all hours. The customer operates the device through some form of video display and keyboard interface. In some operating modes of these devices, the customer's film images are displayed on the video display.

Due to a time delay that may occur before these images appear on the display, some customers may decide to leave the device and come back later for their prints. Such operation produces a problem in that the customer may not be standing in front of the device when their images are displayed. Thus, the privacy of the customer may be compromised by "bystanders" who view the customer's personal images.

SUMMARY OF THE INVENTION

The present invention provides an apparatus for and method of insuring privacy at an automated image media processing station. The image media is herein referred to as film but is meant to comprise other image capture media such as video tape, video disc, and other known media. Accordingly, if a customer during operation of the station remains at the station, no action is required on their part to view their film images and their images are displayed in accordance with the automated operation of the station. Alternatively, if the customer walks away from the machine, their images will not be displayed.

More specifically, an automated film processing station in accordance with the invention includes a film processing apparatus for processing a customer's roll of film and a video display allowing the customer to view images, captured on the roll of film, during the processing. The station includes a customer interface in communication with the processing apparatus for interfacing the customer with the apparatus. A customer detector in communication with the processing apparatus detects the presence of the customer within a detection range and field of view. Detection of such presence allowing the video display to display the images captured on the roll of film for the customer and undetected presence discontinues further display of the film images.

A method of insuring privacy at the automated film processing station includes the steps of detecting the presence or absence of a customer within a detection range and field of view of the processing station;

displaying images captured on the roll of film on the video display;

discontinuing further display of the film images if the customer's absence is detected.

These and other features and advantages of the invention will be more fully understood from the following detailed description of the invention taken together with the accompanying drawings.

DETAILED DESCRIPTION OF THE INVENTION

Figure 1:
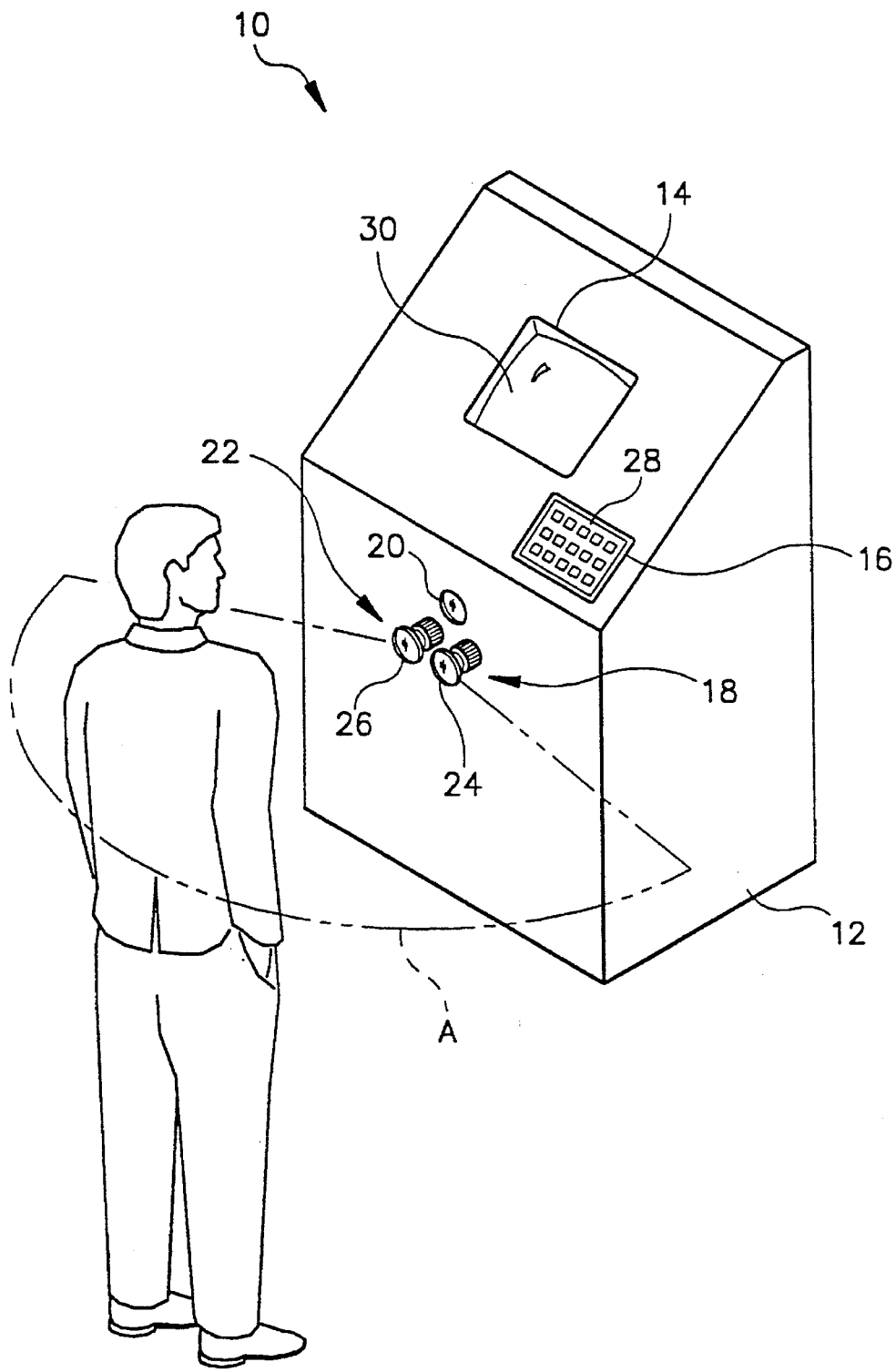
FIG. 1 is a schematic perspective view of a customer at an automated film processing station constructed in accordance with the present invention.

Referring now to the drawings in detail, numeral 10 is used to indicate an automated image media processing station including a film processing apparatus 12 as is known for processing a customer's roll of film, and a video display 14 that allows the customer to view images, captured on the roll of film, during processing.

A customer interface 16 in communication with the processing station 10 interfaces the customer with the processing apparatus. A customer detector 18 in communication with the customer interface 16 or processing apparatus 12 detects the presence or absence of a customer within a detection range and field of view of the detector. As is hereinafter more fully described, the detected presence of the customer allows the video display 14 to display images captured on the roll of film being developed for the customer. Alternatively, undetected presence of the customer discontinues further display of the film images.

With continued reference to FIG. 1, the automated film processing station 10 includes at least one customer detector 18 to detect the presence of a customer within a detection range directly in front of the station. The detector 18 can be a passive infrared detector system 20, as is known, that responds to the heat emitted by living persons. Alternatively the detector 18 can be an active ultrasonic ranging detector system 22 including an ultrasonic emitting energy source 24 and an ultrasonic energy receptor 26 as is known. The customer interface 16 may include a keypad 28 and/or a video touch screen 30 integral with video display 14 or other known interface devices. Arcuate line A in FIG. 1 illustrates the detection range of the detector 18.

Figure 2:
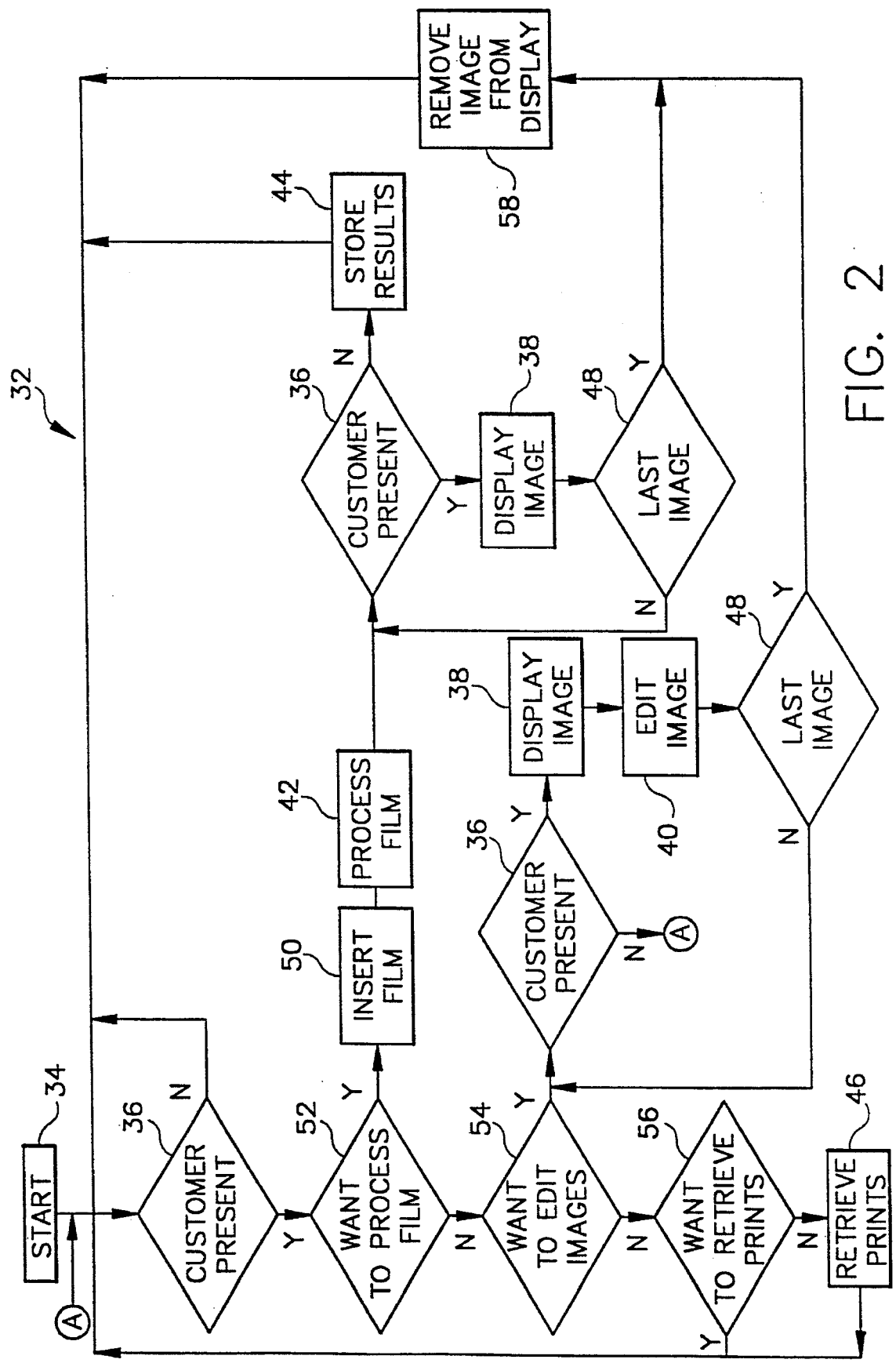
FIG. 2 is a flow chart illustrating processing steps at the film processing station of FIG. 1.

The customer interface 16 includes interface software 32 that provides a transaction sequence illustrated in FIG. 2, including but not limited to processing station 10 activation 34, customer detection 36, and image display 38. In addition, the software 32 may also provide for film printing 40 of processed films and/or film processing 42, image storage 44, image retrieval 46, and last image detection 48. At the beginning of a customer transaction, the customer may activate the station 10 by swiping a credit card, touching the video touch screen 30, or keying data into the keypad 28, and inserting film 50 into the station 10.

Customer commands, to process film, edit images, and retrieve prints 52, 54, 56, respectively, are given by the customer through the customer interface 16. The customer detector 18 is positioned so that when a customer is close enough to activate the interface devices, they will also activate the customer detector. Preferably, the customer interface software can measure the strength of the signal from the detector 18 at the beginning of a customer transaction and remember it during the entire transaction. Based upon the strength of the signal during the transaction, the customer interface software 32 is able to modify the transaction sequence.

If the signal from the customer detector 18 remains substantially equal to the initial value of the signal until the images are ready to be displayed on the video display 14, the film images can be safely shown. After the film images are shown, reprint orders may be taken as part of the transaction sequence. However, if the signal from the customer detector 18 drops to a fraction of the initial value, indicating that the customer has left the vicinity of the processing station 10, the display screen 14 would be actuated to stop display 48 or discontinue any further display of the customer's film images. Alternatively, the video display 14 may revert to its initial display, or display a greeting screen that would instruct the next customer. In the meantime, the film deposited by the first customer would be processed as a background task.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

Parts List 10. image media processing station
12. processing apparatus
14. video display
16. customer interface
18. customer detector
20. infrared detector
22. ultrasonic detector
24. source
26. receptor
28. keypad
30. touch screen
32. software
34. activation
36. customer detection
38. image display
40. film printing
42. film processing
44. image storage
46. image retrieval
48. image detection
50. film
52. command
54. command
56. command

What is claimed is:

1. An automated image media processing station including image media processing apparatus for processing a customer's image media and a video display allowing the customer to view images, captured on said image media, during processing, said station comprising:

a customer interface in communication with said processing apparatus interfacing the customer with said apparatus, including interface software that provides a film related transaction sequence which includes at least one of station activation, customer detection, film processing, film printing, and image display; and a customer detector in communication with at least one of said customer interface and said processing apparatus for detecting the presence of a customer within a detection range and field of view of said detector, such presence allowing said video display to display said images captured on said image media for the customer, and when the customer's presence is undetected, discontinues further display of said images, and processes said image media as a background task without display in accordance with the transaction sequence.

2. The image media processing station of claim 1 wherein said customer interface includes a keypad.

3. The image media processing station of claim 1 wherein said customer interface includes a video touch screen integral with said video display.

4. The image media processing station of claim 1 wherein said customer detector is a passive infrared detector system.

5. The image media processing station of claim 1 wherein said customer detector is an ultrasonic ranging detector system.

6. A method of ensuring privacy at an automated image media processing station including image media processing apparatus for processing a customer's image media in connection with a transaction sequence which includes at least one of station activation, customer detection, film processing, film printing, and image display, and a video display allowing the customer to view images captured on said image media during processing, said method comprising:

detecting the presence of the customer within a detection range and field of view of said station;

displaying images captured on said image media on said video display in accordance with the transaction sequence; and discontinuing further display of said images and processing said film as a background task without display in accordance with the transaction sequence when the customer's presence is undetected.

7. The method of claim 6 wherein said image media is film and said transaction sequence is film related.

* * * * *